UNITED STATES PATENT OFFICE.

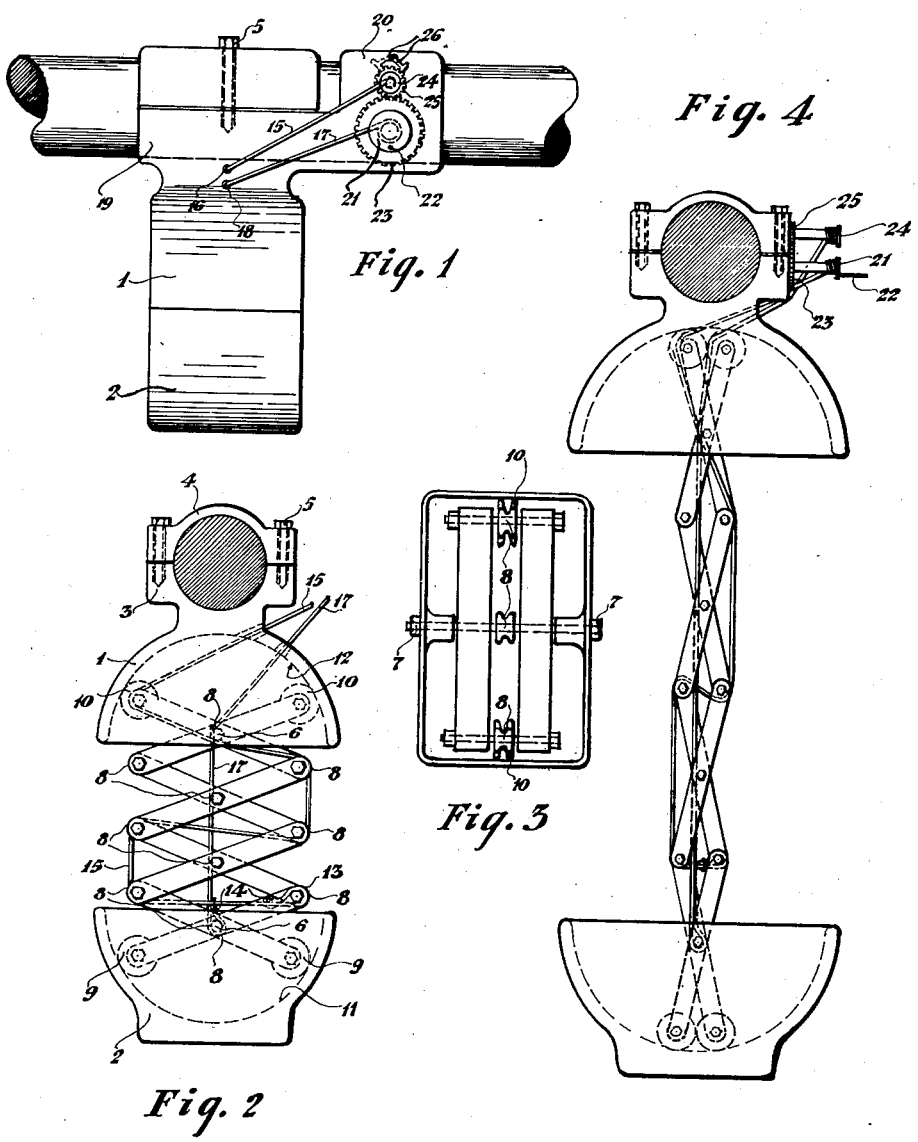

WILLIAM JULIUS EMIL DAMKER, OF DUNELLEN, NEW JERSEY.

STATIONARY JACK.

1,336,620.   Specification of Letters Patent.   Patented Apr. 13, 1920.

Application filed May 22, 1919. Serial No. 298,932.

*To all whom it may concern:*

Be it known that I, WILLIAM J. E. DAMKER, a citizen of the United States, and resident of Dunellen, in the county of Middlesex and State of New Jersey, have invented certain new and useful Improvements in Stationary Jacks, of which the following is a specification.

This invention relates to jacks for automobiles, carriages, and the like, and has for its object to provide a simple, compact, easily operated jack permanently attached to the axle of the vehicle.

This and other objects will become apparent in the description below, in which similar characters of reference refer to like-named parts on the drawings.

I attach my jacks rigidly and permanently to the axles of a vehicle, one on each end of each wheel axle just inside the wheel. Thus, when a tire is blown out, or the wheel for any other reason needs to be raised, it is necessary simply to operate the jack, without incurring the usual labor of first placing the jack in position and adjusting it; thus I eliminate also the danger of not having a jack on the car in such a case, for it is frequent that a jack is mislaid and not available when needed.

In the drawings, Figure 1 is a front elevation of my jack as it appears normally attached to the axle of a vehicle.

Fig. 2 is a side elevation of my jack partly extended, the winding drums being removed.

Fig. 3 is a view looking down upon the members of the lazy tongs folded in the lower casing, showing the pulleys.

Fig. 4 is a side elevation of the jack fully extended, showing the winding drums.

Referring in detail to the drawings, 1 represents the upper half of a casing, and 2 the lower half thereof. Said upper half is provided at the top with a bearing 3 adapted to coöperate with the member 4 to clamp said casing to the axle of the vehicle by means of bolts 5. A lazy tongs is pivotally mounted at 6 on a shaft 7 supported in the sides of said casing 1. Said lazy tongs is pivoted at its lower end similarly in the lower half 2 of said casing, the bottom of the latter being flat or otherwise shaped to permit firm contact with the ground to support the vehicle.

The adjacent members of said lazy tongs are spaced apart both in the center and at the ends by pulleys 8 whose function will be presently described. Rollers or pulleys 9, having deeper peripheral grooves than said pulleys 8, are mounted in the ends of the lowermost members of the lazy tongs, and similar rollers 10 on the ends of the uppermost members. These rollers are adapted to run on the interior circular raceways 11 and 12, respectively of the casing.

A cable 15 of wire or rope is secured at one end to the lazy tong pivot 13, as shown, by a rivet 14, or by any other suitable means. Said cable is then led between adjacent members about said rollers 8, as shown, and out of the upper casing 1 through the hole 16 in the side thereof. It is apparent now that on pulling the upper end of said cable, the lazy tongs will be extended. In order to retract the same thereafter, a second cable 17 is secured at one end to the central roller about the shaft 7, and passed vertically upward in contact with the central rollers or pulleys 8 and out through a second hole 18 directly beneath said hole 16. The bearing block 19, integral with said upper casing 1, is extended laterally to provide a frame 20, upon which is mounted a drum 21 having a winding handle 22. The flange 23 of said drum, adjacent said frame, is toothed as shown. A second drum 24 is mounted directly above said first named drum, and has its flange 25 likewise toothed to engage the flange 23 and to be rotated thereby. Cable 15 is secured upon drum 24, and cable 17 upon drum 21. Since, as is apparent, for a given expansion or retraction of the lazy tongs, cable 15 moves a greater distance than cable 17, the ratio between the gears 23 and 25 is such as to turn drum 24 so much faster than drum 21 as will take up the excess motion of cable 15. A double acting pawl 26 is pivoted directly above the gear 25, being adapted, as is well known, to allow one-way motion in either direction.

When not in use, my jack is carried as shown in Fig. 1. When it is desired to extend the jack, pawl 26 is swung into the position shown in Fig. 1, and handle 22 is turned counter-clockwise; to retract the jack, and lower the vehicle, the pawl is swung into its reverse position and the handle 22 is rotated clockwise.

Thus it is clear that I provide a quick-acting jack, one that cannot be misplaced, inexpensive to manufacture, and neat and compact in appearance. The same, when not in use, takes up no more space than the common shock absorber. My jacks could readily be operated from the driver's seat by providing any suitable and well-known mechanism to link the same with operating levers in the car.

Having thus described my invention, what I claim as new and desire to secure by Letters Patent is as follows:

1. A jack adapted to be permanently attached to a vehicle shaft comprising lazy tongs, an upper casing rigid to said shaft having one end of said lazy tongs pivoted therein, a lower casing having the lower end of said lazy tongs pivoted therein, a cable secured to the lower end of said lazy tongs and wound about the ends of successive members thereof and extending from the upper part thereof so that said jack is extended on pulling the upper end of said cable.

2. A jack adapted to be permanently attached to a vehicle shaft comprising lazy tongs, an upper casing rigid to said shaft having one end of said lazy tongs pivoted therein, a lower casing having the lower end of said lazy tongs pivoted therein, a cable secured to the lower end of said lazy tongs and wound about the ends of successive members thereof and extending from the upper part thereof so that on pulling the same said jack is extended, a second cable rigid to the center of said lower casing thereof and extending from the upper part thereof so that on pulling the same said jack is retracted.

3. A stationary jack comprising lazy tongs having mutually parallel members, an upper casing rigid to the wheel of a vehicle, the upper end of said lazy tongs pivoted in said casing, a lower casing having the lower end of said tongs pivoted therein, pulleys between parallel members of said lazy tongs, and a cable secured to the lower part of said tongs and extending upward in engagement with said pulleys.

4. A stationary jack comprising lazy tongs having mutually parallel members, an upper casing rigid to the wheel of a vehicle, the upper end of said lazy tongs pivoted in said casing, a lower casing having the lower end of said tongs pivoted therein, pulleys between the centers of parallel members of said lazy tongs, pulleys between the ends thereof, a cable secured to the lower part of said tongs passing upward beyond the same in engagement with said end pulleys, and a second cable secured to the lower part of said tongs passing upward beyond the same in engagement with said central pulleys.

5. A stationary jack comprising lazy tongs having mutually parallel members, an upper casing rigid to the wheel of a vehicle, the upper end of said lazy tongs pivoted in said casing, a lower casing having the lower end of said tongs pivoted therein, pulleys between the centers of parallel members of said lazy tongs, pulleys between the ends thereof, a cable secured to the lower part of said tongs passing upward beyond the same in engagement with said end pulleys, and a second cable secured to the lower part of said tongs passing upward beyond the same in engagement with said central pulleys, and holes in said upper casing through which said cables pass.

6. A stationary jack comprising lazy tongs having mutually parallel members, an upper casing rigid to the wheel axle of a vehicle, the upper end of said lazy tongs pivoted in said casing, a lower casing having the lower end of said tongs pivoted therein, pulleys between the ends of parallel members of said lazy tongs, pulleys between the centers thereof, a cable secured to the lower part of said tongs passing upward beyond the same in engagement with said end pulleys, a second cable secured to the lower part of said tongs passing upward beyond the same in engagement with said central pulleys, holes in said upper casing through which said cables pass, and means rigid to said upper casing for winding and unwinding said cables.

7. A stationary jack comprising a lazy tongs having mutually parallel members, an upper casing rigid to the wheel axle of a vehicle, a lazy tongs, the upper end thereof pivoted in the said casing, a lower casing having the lower end of said tongs pivoted therein, pulleys between the centers of parallel members of said lazy tongs, pulleys between the ends thereof, a cable secured to the lower part of said tongs passing upward beyond the same in engagement with said end pulleys, a second cable secured to the lower part of said tongs passing upward beyond the same in engagement with said central pulleys, holes in said upper casing through which said cables pass, and means rigid to said upper casing for winding and unwinding said cables, said means comprising a drum having one flange toothed, a second drum having one flange toothed and engaging said first-named flange and having a greater diameter than said first-named flange, said first-named cable secured to said first-named drum, and said second-named cable secured to said second-named drum.

8. A stationary jack comprising a lazy tongs having mutually parallel members, an upper casing rigid to the wheel axle of a vehicle, a lazy tongs, the upper end thereof pivoted in the said casing, a lower casing having the lower end of said tongs pivoted therein, pulleys between the center of parallel members of said tongs, pulleys between the ends thereof, a cable secured to the lower part of said tongs passing upward beyond the same in engagement with said end pulleys, a second cable secured to the lower part of said tongs passing upward beyond the same in engagement with said central pulleys, holes in said upper casing through which said cables pass, and means on said upper casing for winding and unwinding said cables comprising a drum having one flange toothed, a second drum having one flange toothed and engaging said first-named flange and having a greater diameter than said first-named flange, said first-named cable secured to said first-named drum and said second-named cable secured to second-named drum, and a double acting pawl in engagement with one of said flanges.

Signed at Dunellen, in the county of Middlesex and State of New Jersey, this seventeenth day of May, A. D. 1919.

WILLIAM JULIUS EMIL DAMKER.